July 8, 1952     W. D. WEBBER     2,602,228
PROTRACTOR
Filed Nov. 7, 1950
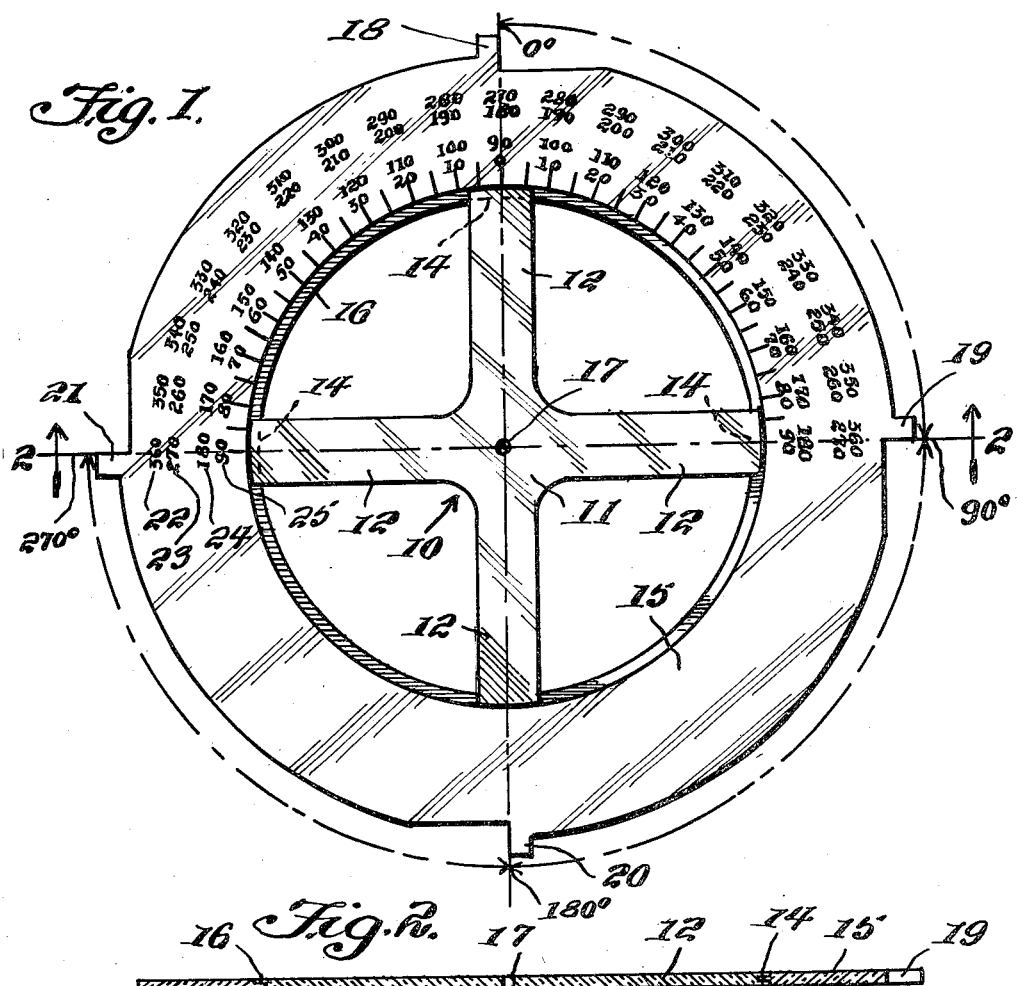
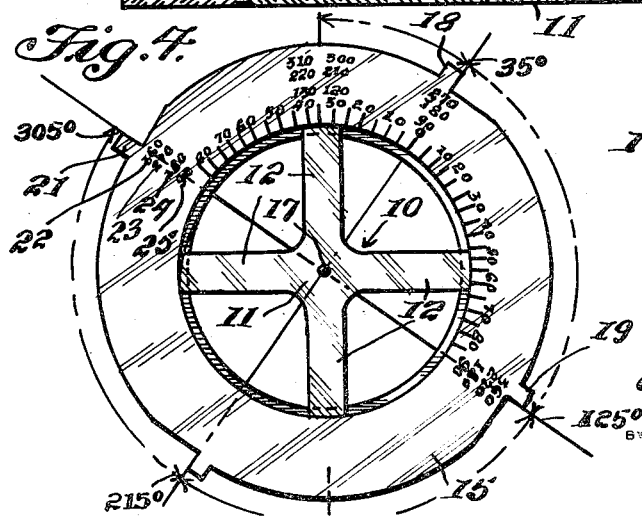
INVENTOR.
William D. Webber,
By Victor J. Evans & Co.
ATTORNEYS Patented July 8, 1952

2,602,228

UNITED STATES PATENT OFFICE 2,602,228

PROTRACTOR

William D. Webber, Chicago, Ill.

Application November 7, 1950, Serial No. 194,501

1 Claim. (Cl. 33—1)

This invention relates to a plotting instrument, and more particularly to a protractor.

The object of the invention is to provide a protractor which includes a central hub and a ring having several sets of graduated scales, or markings, thereon, the ring being rotatably connected to the hub, whereby the protractor can conveniently and accurately be used for plotting or making various calculations.

Another object of the invention is to provide a protractor which includes a central, stationary hub and revoluble ring having graduations thereon to enable the user to determine any degree angle by turning the ring not more than 45° from its zero position.

Another object of the invention is to provide a protractor which is extremely simple and inexpensive to manufacture.

Other objects and advantages will be apparent from the following description.

In the accompanying drawings forming a part of this application, and in which like numerals are used to designate like parts throughout the same:

Figure 1 is a plan view of the protractor constructed according to the present invention;

Figure 2 is a sectional view taken on the line 2—2 of Figure 1;

Figure 3 is an enlarged sectional view showing the sliding connection between the ring and hub;

Figure 4 is a plan view of the protractor of the present invention showing the protractor being used or set for determining an angle.

Referring in detail to the drawings, the numeral 10 designates a stationary hub which may be made of a flexible, transparent, plastic material. The hub 10 includes a central portion 11, and extending from the central portion 11 is a plurality of arms 12, Figure 1. The arms 12 are each provided on their outer end with a groove or slot 14, Figure 3, for a purpose to be later described.

Rotatably connected to the hub 10 is a ring 15, and the ring is fabricated of a transparent material. The ring 15 has projecting inwardly from its inner periphery a tongue 16 which slidably rides in the groove 14, so as to effect a rotatable connection between the ring 15 and the hub 10. The central portion 11 of the hub 10 is provided with an opening 17, whereby a pencil may be readily inserted through the opening 17.

Extending from the outer periphery of the ring 15 and formed integrally therewith are a plurality of pointer elements. These pointer elements are designated by the numerals 18, 19, 20 and 21, and it will be seen that the pointer elements are spaced 90° apart. The ring 15 is further provided with four rows or sets of graduations or markings on its upper half, and these four rows of scales or markings are designated by the numerals 22, 23, 24 and 25. These four rows of markings, starting with the inner row and reading to the right and to the left from the position zero, represent (1) zero degrees to 90 degrees, (2) 90 degrees to 180 degrees, (3) 180 degrees to 270 degrees, and (4) 270 degrees to 360 degrees.

From the foregoing it is apparent that a protractor has been provided which comprises the stationary hub 10 and the movable ring 15. The protractor is designed so that the ring 15 can be either turned to the left or to the right while the hub 10 is held stationary or centered at its zero position. The ring 15 is provided with four rows of graduations 22, 23, 24 and 25, and these graduations are from zero degrees to 360°, and appear only on the upper half of the ring 15. The ring 15 has four pointer elements 18, 19, 20 and 21, which are arranged at 90-degree intervals. Thus, reading to the right from position zero, the distance from element 18 to element 19 is zero degrees to 90°, from pointer element 19 to pointer element 20 is 90° to 180°, from pointer element 20 to pointer element 21 is 180° to 270°, and from pointer element 21 to pointer element 18 is 270° to 360°. Conversely, reading to the left from position zero, from pointer element 18 to pointer element 21 is zero degrees to 90°, from pointer element 21 to pointer element 20 is 90° to 180°, from pointer element 20 to pointer element 19 is 180° to 270°, and finally, from pointer element 19 to pointer element 18 is 270° to 360°.

The following examples are for clarification to show how various angles are determined: Moving the ring 15 10 degrees to the right from position zero, the following angles will result: 10°, 100°, 190°, and 280° at pointer elements 18, 19, 20 and 21, respectively. Conversely, if ring 15 is moved 10 degrees to the left from position zero, the result will be: 10°, 100°, 190°, and 280° at pointer elements 18, 21, 20 and 19. Thus, it is possible to determine any degree angle by turning the ring 15 either to the right or to the left, as the case may be, not more than 45° from position zero. For example, if 70° to the right from position zero is desired, it can be determined by turning ring 15 20° to the left from position zero, resulting in an angle of 70° to the right from position zero at pointer element 19

(90 minus 20), and further, the result will be 160° to the right at pointer element 20 (180 minus 20), and 250° to the right at pointer element 21 (270 minus 20). All angles are determined from one point (hub 10 centered at position zero).

The protractor is preferably made of a transparent plastic material, and the hub 10 is composed of a plastic which is sufficiently flexible so that the hub and ring can be easily assembled or connected together. In Figure 4, there is shown the simple manner in which a line described in any course can be determined, as per the examples in Figure 4 which shows a course of south 35° west, arrived at by moving ring 15 to the position shown in Figure 4.

I claim:

A protractor comprising a stationary hub fabricated of a flexible transparent material, said hub including a central portion and a plurality of arms extending radially from said central portion, there being an opening in said central portion, the outer end of each of said arms being provided with a groove, a transparent ring having an inwardly extending tongue slidably positioned in said grooves, a plurality of pointer elements integral with and extending from the outer periphery of said ring and spaced 90° apart, said ring being provided with a plurality of graduated scales thereon.

WILLIAM D. WEBBER.

REFERENCES CITED

The following references are of record in the file of this patent:

UNITED STATES PATENTS

| Number | Name | Date |
|---|---|---|
| 918,947 | Boljahn | Apr. 20, 1909 |
| 1,346,273 | Solar | July 13, 1920 |
| 1,362,683 | Solar | Dec. 21, 1920 |
| 1,409,303 | Lewis | Mar. 14, 1922 |
| 1,637,933 | Galvin | Aug. 2, 1927 |
| 2,190,071 | Keppers | Feb. 13, 1940 |
| 2,216,490 | Garrett | Oct. 1, 1940 |
| 2,397,002 | Hagner | Mar. 19, 1946 |
| 2,471,327 | Hunt | May 24, 1949 |
| 2,476,338 | Vitez | July 19, 1949 |